Nov. 18, 1924.  
E. SCOTT  
1,516,312  
MOUSETRAP  
Filed April 5, 1923
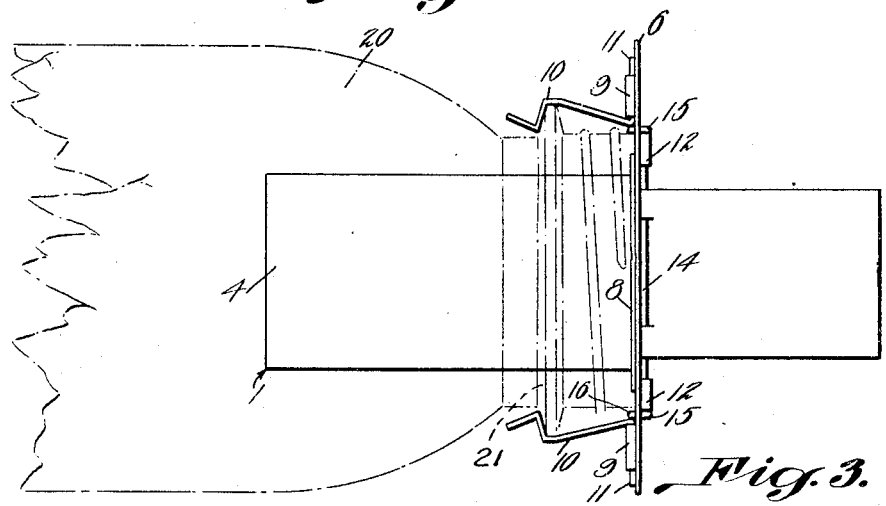
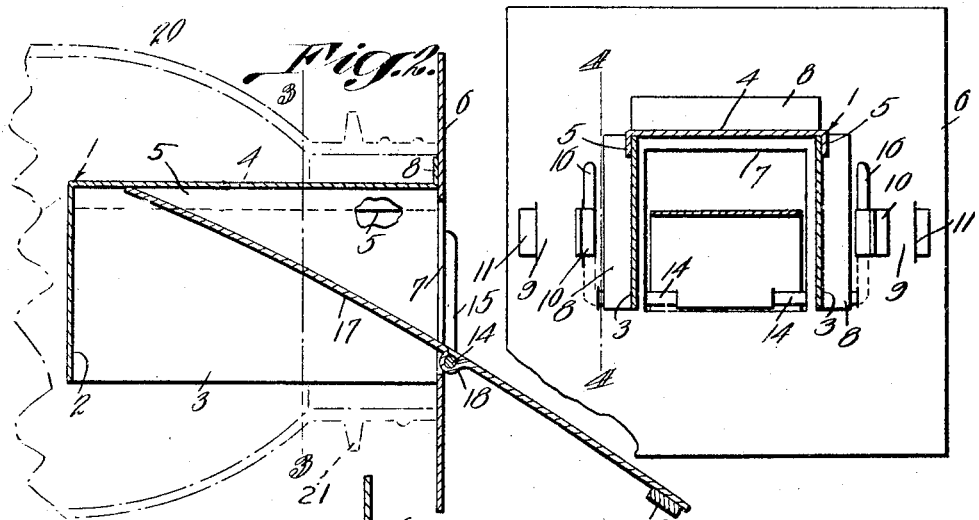
E. Scott, Inventor Patented Nov. 18, 1924.

1,516,312

UNITED STATES PATENT OFFICE.

EMIL SCOTT, OF ELLSWORTH, ILLINOIS.

MOUSETRAP.

Application filed April 5, 1923. Serial No. 630,110.

*To all whom it may concern:*

Be it known that I, EMIL SCOTT, a citizen of the United States, residing at Ellsworth, in the county of McLean and State of Illinois, have invented a new and useful Mousetrap, of which the following is a specification.

The device forming the subject matter of this application is a trap adapted to taking mice and other small animals, and one object of the invention is to provide a trap of the sort specified which can be made cheaply. Another object of the invention is to provide novel means for connecting the trap with a receptacle of any desired sort. Another object of the invention is to improve the construction of the casing of the trap. A further object of the invention is to provide novel means for holding in place the attaching element whereby the casing is secured to a receptacle.

It is within the province of the disclosure to improve generally and to enhance the utility of devices of that type of which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in plan, a device constructed in accordance with the invention, assembled with a fruit jar or other receptacle, parts of the fruit jar being broken away; Figure 2 is a longitudinal section; Figure 3 is a cross section taken aproximately on the line 3—3 of Figure 2; Figure 4 is a vertical sectional view illustrating the relation existing between parts of the shaft and the attaching elements.

In carrying out the invention, there is provided a box-like casing 1 which, preferably is made of metal. The casing 1 includes a back 2 from which sides 3 project forwardly, a top 4 projecting forwardly from the back, the back and the sides preferably being fashioned in one piece with the back. The top 4 has depending flanges 5 overlapped on the sides 3. The casing includes a front plate 6 which is of considerably greater area than the back 2. The sides 3 and 4 have outstanding flanges 8 secured to the rear surface of the front plate 6, and the front plate has an opening 7 giving access to the casing 1. As clearly shown in Figure 2, the casing 1 is open at the bottom.

Retainers or straps 9 are struck rearwardly from the front plate 6 and extend vertically. Spring clips 10, or other attaching elements, extend longitudinally of the sides 3 in spaced relation thereto. The attaching elements 10 have outstanding feet 11 received in the retainers 9. Bearings 12 are struck from the plate 6 and in the bearings 12 a shaft 14 is mounted. The shaft 14 is supplied at its ends with arms 15 extended upwardly along the front surface of the plate 6. The arms 15 terminate in depending fingers 16 extended rearwardly and downwardly through the front plate 6. The lower ends of the fingers 16 engage the inner ends of the feet 11 of the clips 10 and prevent the clips from sliding inwardly out of the retainers 9. It will be observed that, in view of the foregoing construction, it is unnecessary to solder the clips 10 or hold them otherwise in place.

The numeral 17 denotes a platform having a bearing 18 receiving the shaft 14, the platform extending backwardly into the casing 1, through the opening 7 in the front plate 6. At its lower outer end, the platform 17 is weighted, as at 19 so that the inner end of the platform tends to rest against the top 4 of the casing 1 as shown in Figure 2.

In practical operation, the casing 1 extends into a fruit jar 20 or other receptacle, having a rib 21, the front plate 6 abutting against the forward end of the fruit jar. The clips 10 are engaged with the rib 21 and, thus, the casing is held in place in the receptacle or fruit jar, as shown in Figures 1 and 2. When an animal ascends the platform 17, the platform tilts on the shaft 14, and the animal passes out of the bottom of the casing 1, into the fruit jar or other receptacle 20, the platform 17 assuming the closed position of Figure 2 under the action of the weight 19, and acting as a barrier, preventing the trapped animal from finding its way out through the opening 7.

What is claimed is:—

1. A trap comprising a casing, including a front plate, attaching elements extended rearwardly from the front plate and detachably mounted thereon, a shaft mounted on the front plate and having means for engaging the attaching elements to hold them in place on the front plate and a platform tiltably mounted on the shaft.

2. In a device of the class described, a casing including a front plate having retainers, the attaching elements including feet received in the retainers, a shaft on the front plate, the shaft including parts extended through the front plate and engaging the inner ends of the feet to hold the feet in the retainers, and a platform tiltably mounted on the shaft.

In testimony that I claim the foregoing as my own, I have hereto affixed my signature in the presence of two witnesses.

EMIL SCOTT.

Witnesses:
C. O. SHINKLE,
HARRY S. JOHNSTON.